Patented Sept. 10, 1929.

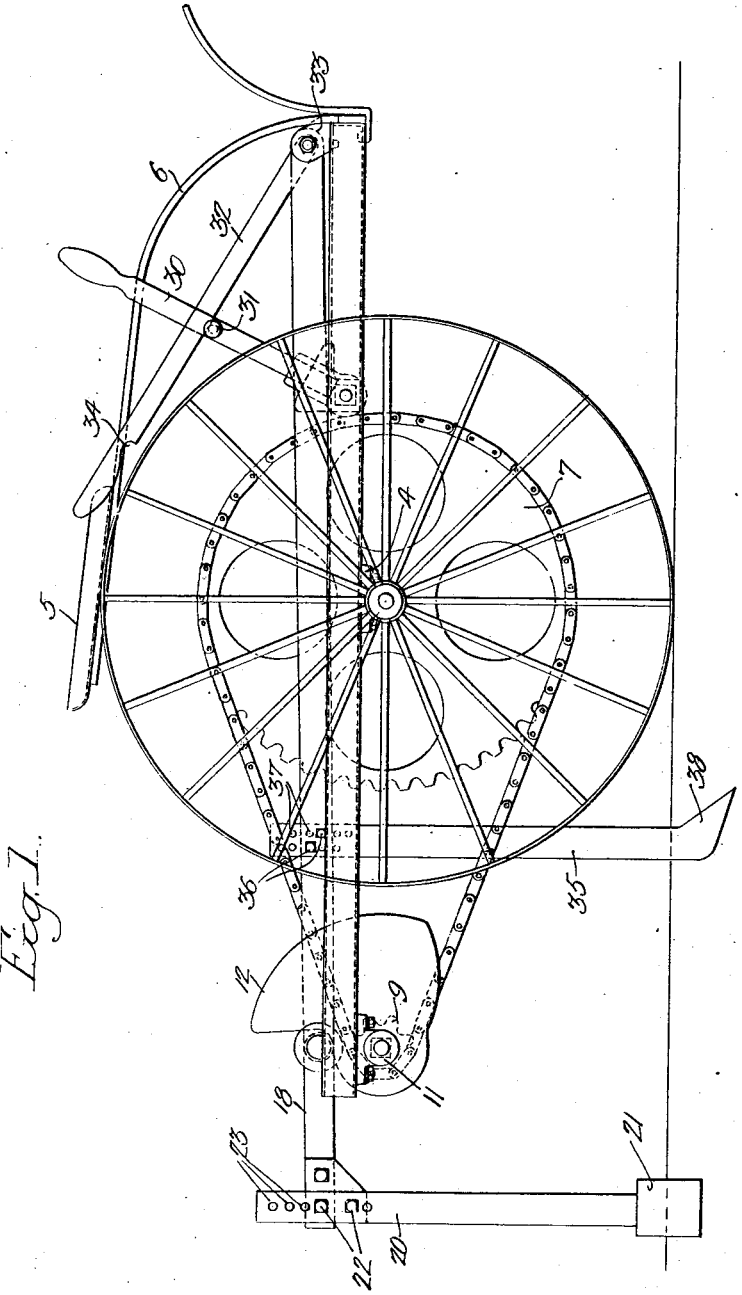

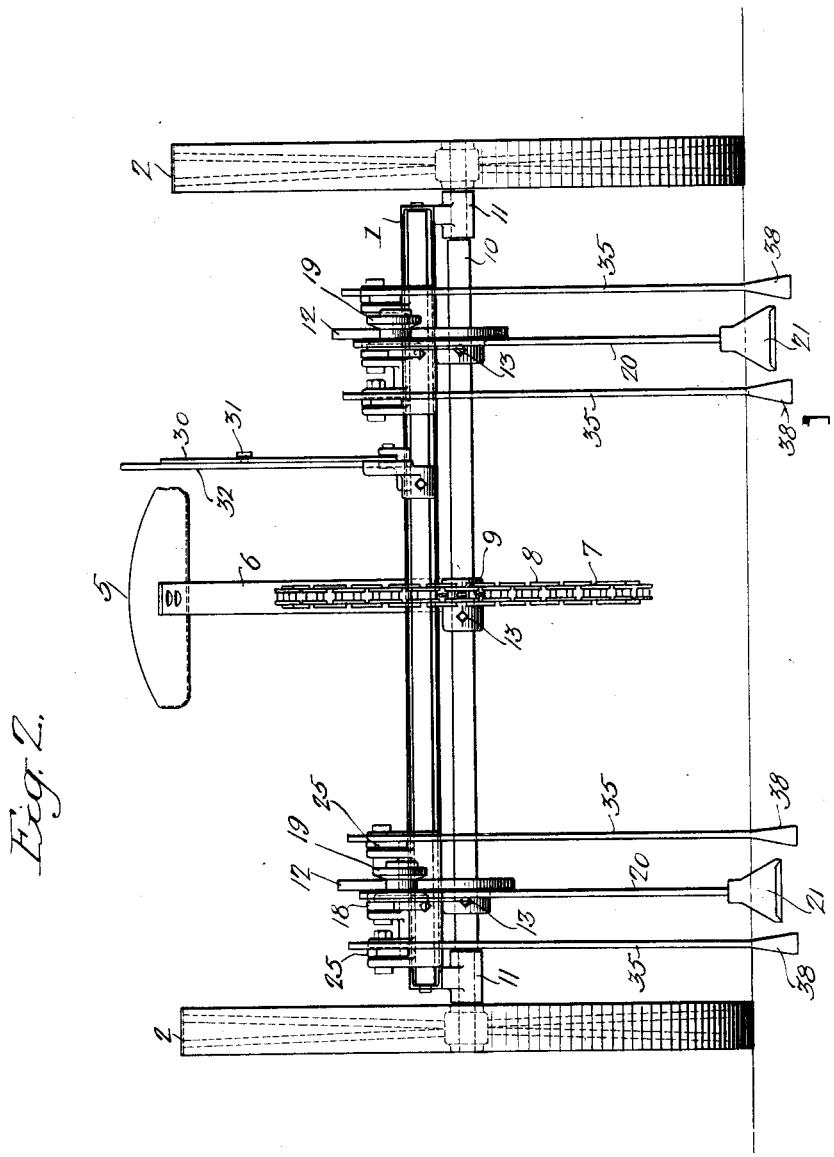

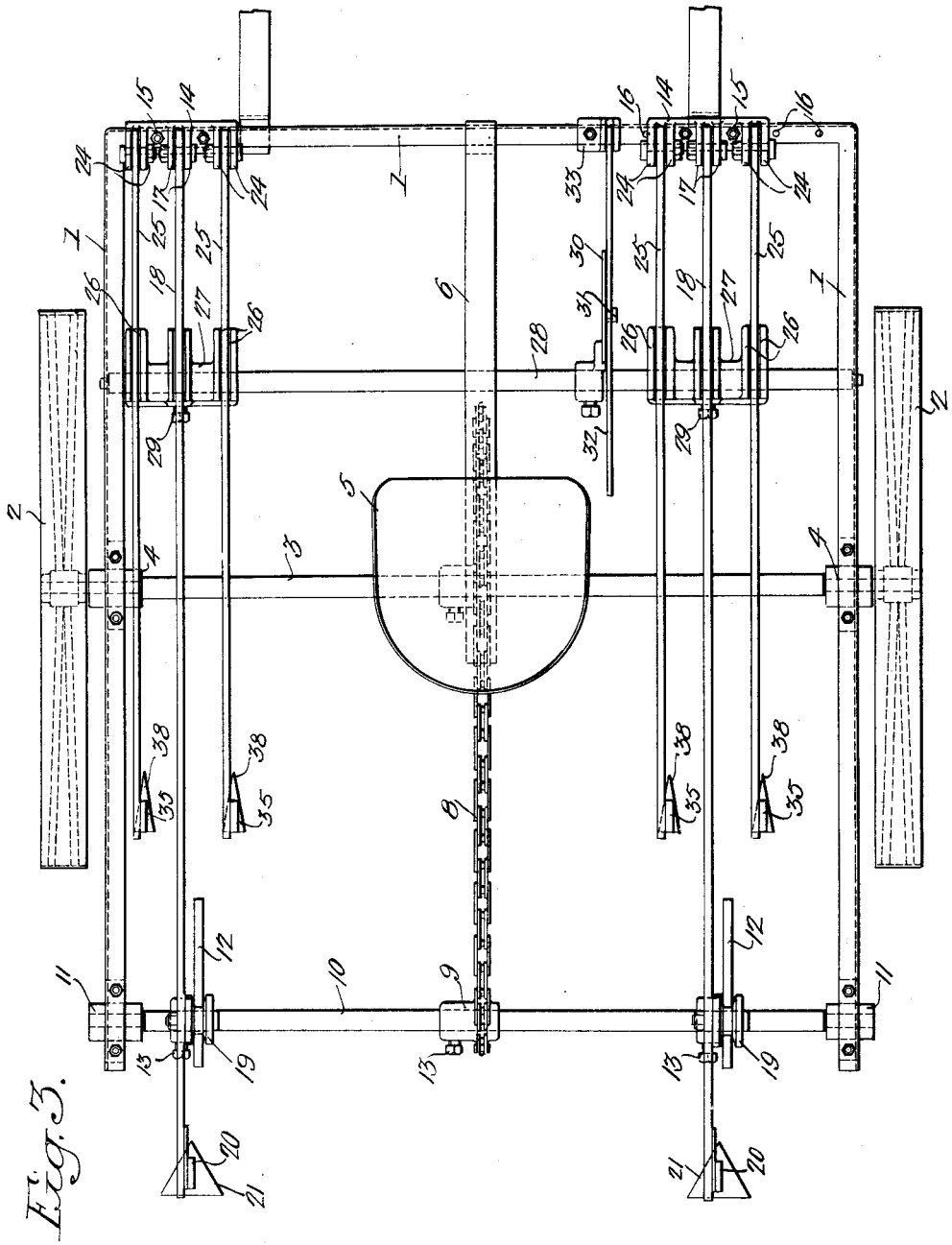

1,728,145

UNITED STATES PATENT OFFICE.

BENJAMIN F. WATKINS, OF PHILADELPHIA, PENNSYLVANIA.

COTTON CHOPPER.

Application filed February 17, 1927. Serial No. 168,965.

This invention relates to improvements in means for thinning out cotton plants in the rows in which they are planted so that the plants may not crowd and choke each other in growing.

It is customary to plant cotton by dropping seeds continuously in parallel rows, the seeds sprouting and springing up continuously in the rows. The thinning out operation is accomplished by chopping out or destroying sections of each row, leaving one or several plants growing in groups approximately one foot apart.

It is the principal object of the invention to provide a machine which when drawn along the rows of plants will automatically chop out the plants at predetermined intervals.

Another object of the invention is to provide a machine of this type that will be capable of cultivating the rows of plants simultaneously with the chopping-out operation.

A further object of the invention is to provide a machine in which the cotton chopping and cultivating elements are capable of transverse adjustment to accommodate the machine to different spacings in the rows of plants.

Another object of the invention is to provide a machine of the stated type in which the cotton chopping and cultivating elements are adjustable vertically to vary the depth of operation in the ground.

A still further object of the invention is to provide a machine of the stated type provided with means for elevating the soil-working elements above the ground to permit free manipulation of the carriage.

In the attached drawings:

Figure 1 is a side elevation of a machine made in accordance with my invention;

Fig. 2 is a rear elevation of the machine; and

Fig. 3 is a plan view of the machine.

With reference to the drawings, the machine comprises a frame 1 supported on wheels 2, these wheels being fixed to an axle 3 journaled in bearings 4, 4 on the under side of the frame 1. The machine further comprises a seat 5 for an operator mounted at the upper end of a pedestal arm 6 extending rearwardly from the front of the frame. The axle 3 has attached thereto a sprocket 7 which is connected through a chain 8 with a sprocket 9 on a transverse shaft 10 journaled in bearings 11 at the rear of the frame 1. The shaft 10 also carries, one at either side of the sprocket 9, a cam 12. By reference to Figure 1, it will be noted that the shaft 10 or that portion intermediate the bearings 11 is rectangular in form, the hub of the sprocket 9 and of the cams 12 having each a correspondingly formed opening through which the shaft extends, and being held against axial movement on the shaft by set screws 13. It will be apparent that by reason of the operative connection between the shafts 3 and 10, the latter is rotated in the bearings 11 as the carriage is advanced over the ground.

Secured to the front bar of the frame 1 is a pair of brackets 14, these being held in place in the present instance by bolts 15 which extend through the brackets and through apertures in the frame. A number of these apertures 16 is provided at one side so that one of the brackets may be adjusted transversely on the front bar of the frame for a purpose hereinafter set forth.

Each of the brackets 14 has an intermediate pair of lugs 17 between which are pivotally secured the rear ends of bars 18 which extend rearwardly and which have near their rear ends rollers 19 which respectively rest upon the cams 12, as clearly illustrated. Depending from the end of each of the bars 18 is adjustably secured a bar 20 carrying at its lower end a plow element 21 adapted to enter and dig up the earth, as hereinafter set forth. The bars 20 are secured to the bars 18 by bolts 22 which pass through the bars 18 and through apertures 23 in the bars 20. A number of these apertures are arranged longitudinally of the bars 20 so that a vertical adjustment of the latter with respect to the bars 18 is provided.

Each of the brackets 14 is provided with two sets of lugs 24 arranged respectively on opposite sides of the lugs 17, and between each of the pairs of lugs 24 is pivotally supported an arm 25. These arms extend rearwardly and are supported intermediate their ends in slots 26 in brackets 27 mounted on a rectangular shaft 28, whose ends are journaled in the sides of the frame 1. The brackets 27 in each case are held axially of the shaft by set screws 29. It will be noted that the brackets are also provided with slots for reception of the bars 18.

Attached to the shaft 28 and extending upwardly adjacent the operator's seat 5 is a lever 30 having a roller 31 at one side which engages the under side of a second lever 32 pivotally secured in a bracket 33 on the front bar of the frame 1. The lever 32 has a notch or recess 34 near its outer end which the roller 31 enters when the lever 30 is drawn backwardly towards the driver's seat, the roller being retained in the notch 34 and preventing return of the lever 30 until the lever 32 is moved upwardly. The brackets 27 are so eccentrically formed that when the shaft is oscillated as by drawing the lever 30 rearwardly from the normal advanced position in which it is shown in Fig. 1, the rods 18 and 25 are elevated around their pivots in the brackets 14. At the rear ends of the arms 25 are downwardly projecting arms or bars 35 which are secured to the arms 25 by means of bolts 36 and a series of holes 37 is provided in the bars 35 so that they may be adjusted vertically with respect to the arms 25. At the lower ends of the rods 35 are cultivator plows 38, which function as hereinafter described. It will be apparent that by means of the lever 30, the operator may elevate the arms 18 and 25 so as to render the soil working elements 38 inoperative.

In operation, the carriage is drawn longitudinally of the rows of cotton plants so that the cutter plow 21 operates directly over and periodically on the rows of plants, while the cultivator elements 38 slightly turn up the ground at each side of the row. Accordingly as the carriage is advanced, the cutter plow 21 is periodically depressed and operates on the rows of plants to thin them out as described above. The transverse adjustment of one or both of the brackets 14 and 27 and of the cams 12 provides for relative adjustment of the cutting elements in accordance with the distance between the rows of plants to be operated on.

It will be apparent that the machine is capable of use for other purposes than that described although its most useful and novel function is that of thinning out cotton and like plants. As to the structural details of the machine, there may be numerous modifications without departure from the essential features of the invention.

I am aware that machines intended for plant thinning operations have been made previous to my own, but so far as I am aware I am the first to bring forth a machine operating longitudinally of the rows of plants, which has many advantages over transverse operation as previously conducted.

I claim:

1. In a plant-thinning machine, the combination with a carriage, of a soil-disturbing element mounted on the carriage, mechanism for vertically oscillating said element, a pair of arms pivotally mounted on the carriage and transversely offset at opposite sides of said element, a transverse shaft including an eccentric bracket adapted normally to support the said arms in a substantially horizontal position, cultivating elements carried by said arms, and means for oscillating the transverse shaft and the arm-supporting bracket so as to elevate the said arms to render the cultivating elements inoperative.

2. In a plant-thinning machine, the combination with a wheeled carriage, of an arm pivotally secured at the front of the carriage, means for elevating the arm about its pivot including a rock shaft and a cam carried thereby, a second shaft journaled in the carriage, a cam carried by said shaft and adapted normally to support said pivoted arm, mechanism for rotating the last-named shaft to vertically oscillate the arm about its pivot, and a soil-disturbing element carried by said arm, the arm, the elevating cam and the oscillating cam all being transversely adjustable on the carriage.

3. In a plant thinning machine, the combination with a carriage, of a soil disturbing member mounted on the carriage, mechanism for alternately raising and lowering said member, cultivating elements transversely offset with respect to said member, a transverse shaft including an eccentric bracket adapted to support said cultivating elements, and means for oscillating the shaft and bracket to elevate and render the cultivating elements inoperative.

BENJAMIN F. WATKINS.